(12) United States Patent
Keating

(10) Patent No.: US 8,627,803 B2
(45) Date of Patent: Jan. 14, 2014

(54) VARIABLE DISPLACEMENT ENGINE ASSEMBLY INCLUDING PARTIAL BOOST ARRANGEMENT

(75) Inventor: Edward J. Keating, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 409 days.

(21) Appl. No.: 12/947,881

(22) Filed: Nov. 17, 2010

(65) Prior Publication Data

US 2012/0118274 A1    May 17, 2012

(51) Int. Cl.
*F02B 33/00* (2006.01)

(52) U.S. Cl.
USPC .............. 123/559.1; 123/432; 123/198 F; 60/597; 60/598; 60/600

(58) Field of Classification Search
USPC ............. 123/559.1, 432; 60/597, 598, 600
See application file for complete search history.

(56) References Cited

U.S. PATENT DOCUMENTS

| | | | | |
|---|---|---|---|---|
| 3,432,152 A * | 3/1969 | Sweeney | | 261/34.2 |
| 4,470,394 A * | 9/1984 | Tadokoro et al. | | 123/432 |
| 4,554,890 A * | 11/1985 | Okimoto et al. | | 123/26 |
| 4,726,343 A * | 2/1988 | Kruger | | 123/432 |
| 4,834,048 A * | 5/1989 | Adamis et al. | | 123/432 |
| 5,379,743 A * | 1/1995 | Stokes et al. | | 123/308 |
| 5,427,078 A * | 6/1995 | Hitomi et al. | | 123/559.1 |
| 6,233,935 B1 * | 5/2001 | Kahlon et al. | | 60/605.1 |
| 6,470,681 B1 * | 10/2002 | Orton | | 60/605.1 |
| 6,874,463 B1 * | 4/2005 | Bolander et al. | | 123/198 F |
| 6,951,211 B2 * | 10/2005 | Bryant | | 123/559.1 |
| 7,448,359 B2 * | 11/2008 | Jankovic | | 123/432 |
| 7,673,617 B2 * | 3/2010 | Pagot | | 123/432 |
| 7,909,025 B2 * | 3/2011 | Pagot | | 123/559.1 |
| 7,997,237 B2 * | 8/2011 | Surnilla | | 123/21 |
| 8,069,663 B2 * | 12/2011 | Ulrey et al. | | 60/605.2 |
| 8,312,849 B2 * | 11/2012 | Roe et al. | | 123/90.16 |
| 8,347,624 B2 * | 1/2013 | Pursifull et al. | | 60/598 |
| 8,375,904 B2 * | 2/2013 | Gustafson | | 123/90.15 |
| 2004/0065308 A1 * | 4/2004 | Bryant | | 123/562 |
| 2008/0208434 A1 * | 8/2008 | Bryant | | 701/103 |
| 2010/0154740 A1 * | 6/2010 | Mitsuishi | | 123/347 |
| 2012/0023935 A1 * | 2/2012 | Pursifull et al. | | 60/605.2 |

* cited by examiner

*Primary Examiner* — Thomas Denion
*Assistant Examiner* — Thomas Olszewski
(74) *Attorney, Agent, or Firm* — Harness, Dickey & Pierce, P.L.C.

(57) ABSTRACT

An engine assembly may include an engine structure, a first intake valve, a first valve lift mechanism, a second intake valve, a second valve lift mechanism, and a boost mechanism. The first intake valve may be located in a first intake port and the first valve lift mechanism may be engaged with the first intake valve. The second intake valve may be located in a second intake port and the second valve lift mechanism may be engaged with the second intake valve and operable in first and second modes. The second intake valve may be displaced to an open position during the first mode and may be maintained in a closed position during the second mode. The boost mechanism may be in communication with an air source and the first intake port and isolated from the second intake port.

20 Claims, 4 Drawing Sheets

VARIABLE DISPLACEMENT ENGINE ASSEMBLY INCLUDING PARTIAL BOOST ARRANGEMENT

FIELD

The present disclosure relates to boost arrangements for variable displacement engines.

BACKGROUND

This section provides background information related to the present disclosure which is not necessarily prior art.

Internal combustion engines may combust a mixture of air and fuel in cylinders and thereby produce drive torque. A variety of arrangements may be used to limit fuel consumption while providing a desired engine power output. In one example, deactivating valve lift mechanisms may be included to increase fuel efficiency by effectively shutting off cylinders during low power demand conditions.

SUMMARY

An engine assembly may include a boost mechanism, an engine structure, a first intake valve, a first valve lift mechanism, a second intake valve, and a second valve lift mechanism. The boost mechanism may be in communication with an air source. The engine structure may define a first cylinder bore, a second cylinder bore, a first intake port in communication with the air source via the boost mechanism and the first cylinder bore, and a second intake port in communication with the air source and the second cylinder bore and isolated from the boost mechanism. The first intake valve may be located in the first intake port and the first valve lift mechanism may be engaged with the first intake valve. The second intake valve may be located in the second intake port and the second valve lift mechanism may be engaged with the second intake valve and operable in first and second modes. The second intake valve may be displaced to an open position by the second valve lift mechanism during the first mode and the second intake valve may be maintained in a closed position by the second valve lift mechanism during the second mode.

A method may include providing a compressed intake air flow higher than atmospheric pressure to a first intake port of an engine assembly. A first intake valve located in the first intake port may be opened with a first valve lift mechanism. A naturally aspirated intake air flow may be provided to a second intake port of the engine assembly. The second valve lift mechanism may be operated in a first mode where a second valve lift mechanism opens a second intake valve located in the second intake port. The second valve lift mechanism may be operated in a second mode where the second valve lift mechanism maintains the second intake valve in a closed position during engine operation.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
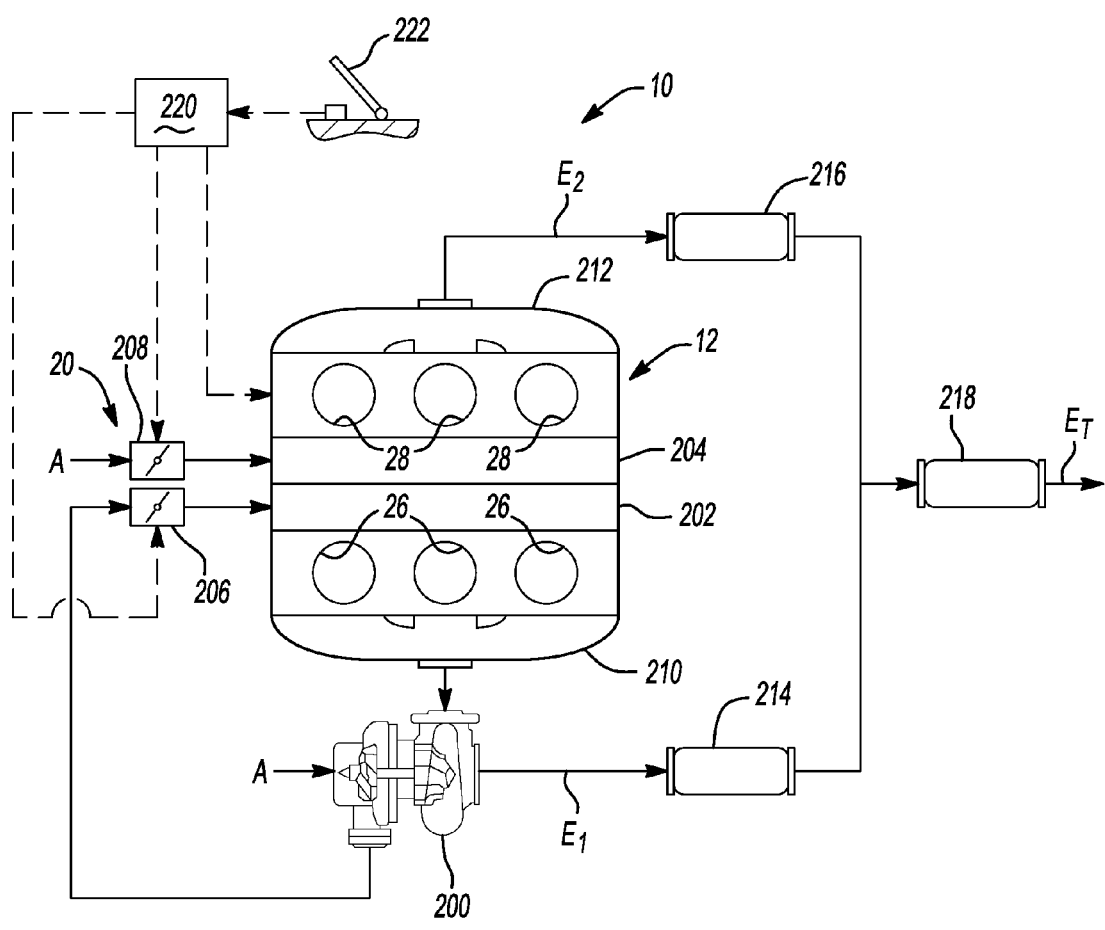
FIG. 1 is a schematic illustration of an engine assembly according to the present disclosure.
Figure 2:
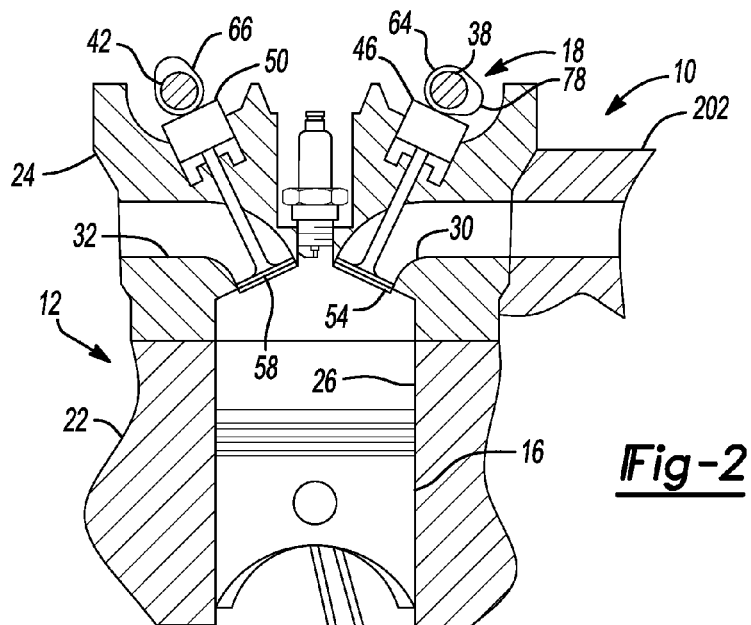
FIG. 2 is a section view of the engine assembly of FIG. 1.
Figure 3:
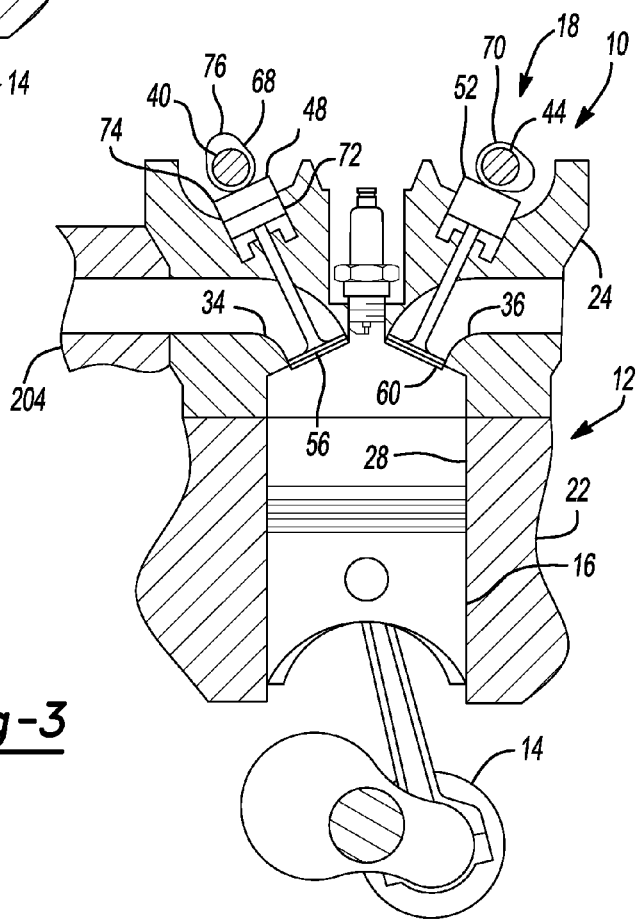
FIG. 3 is an additional section view of the engine assembly of FIG. 1.

An engine assembly 10 is illustrated in FIGS. 1-3 and may include an engine structure 12, a crankshaft 14, pistons 16, a valvetrain assembly 18 and an intake assembly 20. The engine structure 12 may include an engine block 22 and cylinder heads 24. The engine structure 12 may define a first set of cylinder bores 26 and a second set of cylinder bores 28 disposed at an angle relative to one another. However, while described in combination with a V-6 engine configuration, it is understood that the present teachings apply to any number of piston-cylinder arrangements and a variety of reciprocating engine configurations including, but not limited to, V-engines, inline engines, and horizontally opposed engines, as well as both overhead cam and cam-in-block configurations.

The engine structure 12 may define a first set of intake ports 30 and a first set of exhaust ports 32 in the cylinder head 24 associated with the first set of cylinder bores 26 and a second set of intake ports 34 and a second set of exhaust ports 36 in the cylinder head 24 associated with the second set of cylinder bores 28. Referring to FIGS. 2 and 3, the engine assembly 10 will be described relative to a first cylinder bore 26 (included in the first set of cylinder bores 26) and a second cylinder bore 28 (included in the second set of cylinder bores 28) for simplicity.

The valvetrain assembly 18 may include first, second, third and fourth camshafts 38, 40, 42, 44, first, second, third and fourth valve lift mechanisms 46, 48, 50, 52, first and second intake valves 54, 56 and first and second exhaust valves 58, 60. With reference to FIG. 2, the first intake valve 54 may be located in the first intake port 30 and the first exhaust valve 58 may be located in the first exhaust port 32. The first valve lift mechanism 46 may be engaged with the first intake valve 54 and a first camshaft lobe 64 defined on the first camshaft 38. The third valve lift mechanism 50 may be engaged with the first exhaust valve 58 and a third camshaft lobe 66 defined on the third camshaft 42.

With reference to FIG. 3, the second intake valve 56 may be located in the second intake port 34 and the second exhaust valve 60 may be located in the second exhaust port 36. The second valve lift mechanism 48 may be engaged with the second intake valve 56 and a second camshaft lobe 68 defined on the second camshaft 40. The fourth valve lift mechanism 52 may be engaged with the second exhaust valve 60 and a fourth camshaft lobe 70 defined on the fourth camshaft 44.

The second valve lift mechanism 48 may form a deactivating valve lift mechanism. More specifically, the second valve lift mechanism 48 (schematically illustrated in FIG. 3) may include a first member 72 engaged with the second intake valve 56 and a second member 74 engaged with the second camshaft lobe 68. The second valve lift mechanism 48 may be operable in first and second modes. The second intake valve 56 may be displaced to an open position by the second valve lift mechanism 48 during the first mode when a peak 76 of the second camshaft lobe 68 engages the second valve lift mechanism 48. The second intake valve 56 may remain in a closed position during the second mode when the peak 76 of the second camshaft lobe 68 engages the second valve lift mechanism 48.

Figure 4:
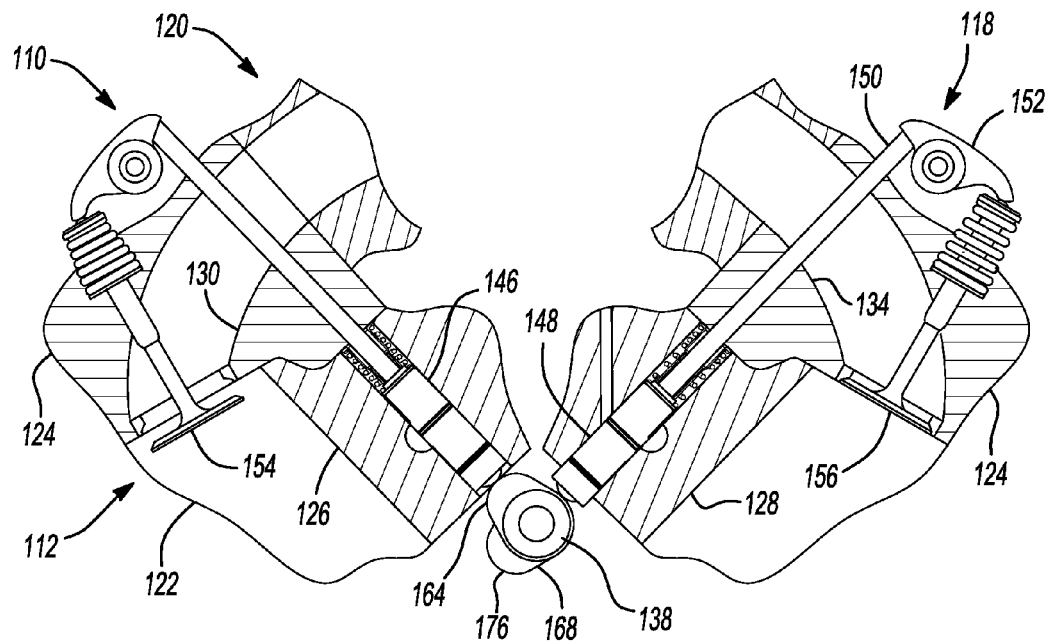
FIG. 4 is a section view of an alternate engine assembly according to the present disclosure.

The engine assembly 10 is illustrated as an overhead cam engine. However, as discussed above, the present teachings are not limited to overhead cam engines. FIG. 4 illustrates an exemplary cam-in-block (or pushrod) engine assembly 110. The engine assembly 110 may include an engine structure 112, a crankshaft (not shown), pistons (not shown), a valvetrain assembly 118 and an intake assembly 120. The engine structure 112 may include an engine block 122 and cylinder heads 124. The engine structure 112 may define a first set of cylinder bores 126 and a second set of cylinder bores 128 disposed at an angle relative to one another.

The valvetrain assembly 118 may include a camshaft 138, first and second valve lift mechanisms 146, 148, and first and second intake valves 154, 156. The first intake valve 154 may be located in the first intake port 130 and the second intake valve 156 may be located in the second intake port 134. The first valve lift mechanism 146 may be engaged with the first intake valve 154 and a first camshaft lobe 164 defined on the camshaft 138. The second valve lift mechanism 148 may be engaged with the second intake valve 156 and a second camshaft lobe 168 defined on the camshaft 138.

Figure 5:
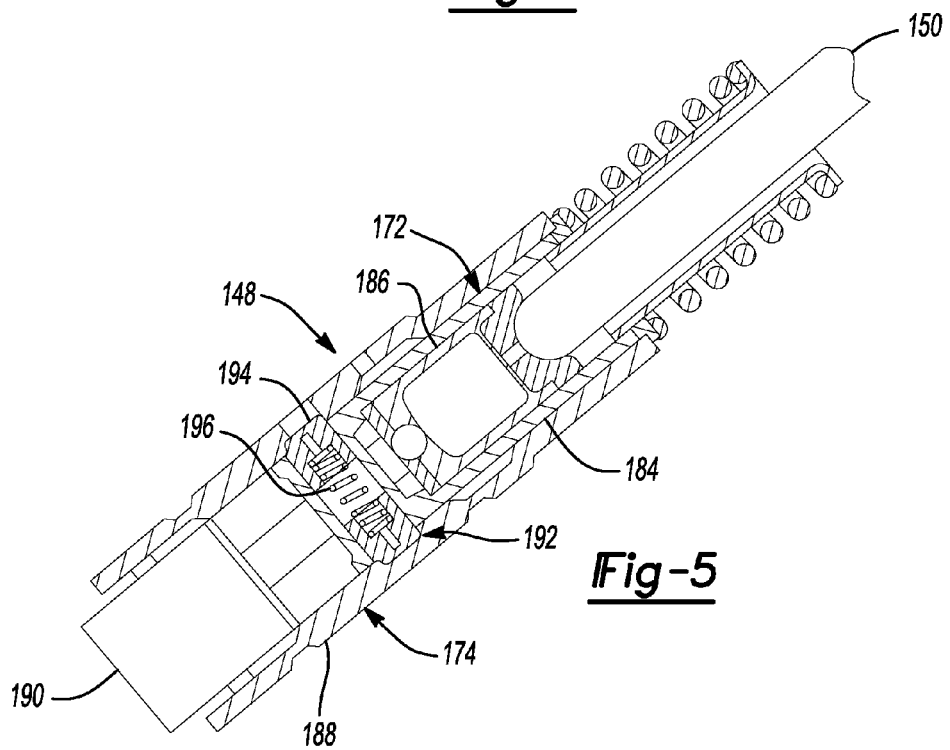
FIG. 5 is a section view of a valve lift mechanism from the engine assembly of FIG. 4.

With additional reference to FIG. 5, the second valve lift mechanism 148 may form a deactivating valve lift mechanism. More specifically, the second valve lift mechanism 148 may include a first member 172 engaged with the second intake valve 156 (via a pushrod 150 and rocker arm 152) and a second member 174 engaged with the second camshaft lobe 168. The second valve lift mechanism 148 may be operable in first and second modes. The second intake valve 156 may be displaced to an open position by the second valve lift mechanism 148 during the first mode when a peak 176 of the second camshaft lobe 168 engages the second valve lift mechanism 148. The second intake valve 156 may remain in a closed position during the second mode when the peak 176 of the second camshaft lobe 168 engages the second valve lift mechanism 148.

In the present non-limiting example, the first member 172 of the second valve lift mechanism 148 may include a first housing 184 housing a hydraulic lash adjuster 186 engaged with the pushrod 150. The second member 174 of the second valve lift mechanism 148 may include a second housing 188 and a cam follower 190 coupled to the first housing 184. The second valve lift mechanism 148 may include a locking mechanism 192 that selectively provides operation of the second valve lift mechanism 148 in the first and second modes.

The locking mechanism 192 may include a lock pin 194 and a biasing member 196 fixed to the second member 174. The lock pin 194 may be displaced between first and second positions by a pressurized fluid supply, such as engine oil. In the first position (shown in FIG. 6), the lock pin 194 may extend into the first member 172 and secure the first and second members 172, 174 for axial displacement with one another. In the second position (not shown), the lock pin 194 may extend radially inward relative to the first position to allow axial displacement of the first and second members 172, 174 relative to one another.

The second valve lift mechanism 48 (shown schematically in FIG. 3) may operate in a manner similar to the second valve lift mechanism 148 shown in FIG. 5, having a locking mechanism that selectively fixes the first and second members 72, 74 for displacement with one another. The second valve lift mechanism 48 may take a variety of forms including, but not limited to a rocker arm and a direct acting lifter.

Referring back to FIGS. 1-3, the first intake ports 30 and the second intake ports 34 may be in communication with an air source (A) via the intake assembly 20. The intake assembly 20 may include a boost mechanism 200, a first intake manifold 202, a second intake manifold 204, a first throttle valve 206 and a second throttle valve 208. The boost mechanism 200 may be in communication with the air source (A) and the first intake port 30 and may be isolated from the second intake port 34.

The first set of cylinder bores 26 may be in communication with the boost mechanism 200 and the second set of cylinder bores 28 may be isolated from the boost mechanism 200. The first set of cylinder bores 26 may be in communication with the first intake manifold 202. The second set of cylinder bores 28 may be in communication with the second intake manifold 204. The first intake manifold 202 may be in communication with the first intake port 30 and the air source (A) via the boost mechanism 200. The first intake manifold 202 may provide a compressed air flow at greater than atmospheric pressure to the first set of cylinder bores 26 from the boost mechanism 200. The second intake manifold 204 may be in communication with the second intake port 34 and the air source (A). The second intake manifold 204 may provide a naturally aspirated air flow at atmospheric pressure to the second set of cylinder bores 28.

It is understood that while the boost mechanism 200 may provide a compressed air flow, the first throttle valve 206 may ultimately control air flow to the first set of cylinder bores 26. Therefore, during some operating conditions, the air flow provided to the first set of cylinder bores 26 may be at a reduced pressure depending on the position of the first throttle valve 206. Similarly, the second throttle valve 208 may control air flow to the second set of cylinder bores 28. Therefore, during some operating conditions, the air flow provided to the second set of cylinder bores 28 may be at a reduced pressure depending on the position of the second throttle valve 208.

The first throttle valve 206 may be in communication with the first intake port 30 and may control an air flow into the first intake port 30. The second throttle valve 208 may be in communication with the second intake port 34 and may control an air flow into the second intake port 34. More specifically, the first throttle valve 206 may control air flow into the first intake manifold 202 from the boost mechanism 200 and the second throttle valve 208 may control air flow into the second intake manifold 204. The boost mechanism 200 may include a turbocharger driven by exhaust gas ($E_1$) from the first set of cylinder bores 26. However, it is understood that the present disclosure is not limited to boost mechanisms including a turbocharger and applies equally to a variety of alternate arrangements including, but not limited to, superchargers.

The engine assembly 10 may additionally include a first exhaust manifold 210 in communication with the first cylinder bores 26 and a second exhaust manifold 212 in communication with the second cylinder bores 28. Exhaust gases from the engine assembly 10 may be provided to a vehicle exhaust system including first, second, and third catalysts 214, 216, 218. The first exhaust manifold 210 may provide the exhaust gas ($E_1$) from the first set of cylinder bores 26 to the boost mechanism 200. The exhaust gas ($E_1$) may be directed to the first catalyst 214 after exiting the boost mechanism 200. The second exhaust manifold 212 may provide the exhaust gas ($E_2$) from the second set of cylinder bores 28 to the second catalyst 216. The combined exhaust gas ($E_T$) from the first and second exhaust manifolds 210, 212 may be provided to a third catalyst 218 before being released to the atmosphere. Having the exhaust gas ($E_2$) from the second set of cylinder bores 28 provided directly to the vehicle exhaust system may improve catalyst warm-up time relative to an engine having all of the exhaust gas directed to a boost mechanism before proceeding to a catalyst.

The engine assembly 10 may include a control module 220 that is in communication with and controls operation of the first and second throttle valves 206, 208 and the second valve lift mechanism 48 (deactivating valve lift mechanism) based on engine power demand. Engine power demand may be indicated by the position of an accelerator pedal 222 in communication with the control module 220. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

During engine operation, a compressed intake air flow at greater than atmospheric pressure may be provided to the first intake port 30 of the engine assembly 10 and the first intake valve 54 is opened with the first valve lift mechanism 46. A naturally aspirated intake air flow at atmospheric pressure may be provided to the second intake port 34 of the engine assembly 10. The second valve lift mechanism 48 may be operated in the first mode to open the second intake valve 56 and may be operated in the second mode to maintain the second intake valve 56 in the closed position during engine operation.

The first intake valve 54 may be opened when the first valve lift mechanism 46 is engaged with the peak 78 of the first camshaft lobe 64. Operating the second valve lift mechanism 48 in the first mode may include opening the second intake valve 56 when the second valve lift mechanism 48 is engaged with the peak 76 of the second camshaft lobe 68. Operating the second valve lift mechanism 48 in the second mode may include the second intake valve 56 remaining in the closed position when the peak 76 of the second camshaft lobe 68 engages the second valve lift mechanism 48. The second valve lift mechanism 48 may be operated in the second mode while the first valve lift mechanism 46 is operated in a third mode where the first intake valve 54 is opened when the first valve lift mechanism 46 is engaged with the peak 78 of the first camshaft lobe 64.

The first valve lift mechanism 46 may be operated in the third mode and the second valve lift mechanism 48 may be operated in the first mode during a vehicle acceleration condition. Providing the compressed air flow at greater than atmospheric pressure may include driving a turbocharger (boost mechanism 200) with an exhaust gas flow from the engine assembly 10. The second valve lift mechanism 48 may be switched from the first mode to the second mode after the turbocharger reaches a predetermined boost condition.

The first valve lift mechanism 46 may be operated in the third mode and the second valve lift mechanism 48 may be operated in the first mode during start-up of the engine assembly 10. The engine assembly 10 may be operated during a first power demand condition where a first engine power output is demanded and may be operated during a second power demand condition where a second engine power output greater than the first engine power output is demanded. The first engine power output may be less than full engine power output and the second engine power output may approach maximum engine power output.

The first valve lift mechanism 46 may be operated in the third mode during the first power demand condition and the second power demand condition. The second valve lift mechanism 48 may be operated in the second mode during the first power demand condition and in the first mode during the second power demand condition. The second valve lift mechanism 48 may be operated in the first mode during a transition within the first power demand condition and during the second power demand condition. By way of non-limiting example, the second valve lift mechanism 48 may be operated in the first mode during a vehicle acceleration condition.

In the example illustrated in FIG. 1, a set of valve lift mechanisms (including the second valve lift mechanism 48) may be operable in the first and second modes. The second set of cylinder bores 28 may each have one of the deactivating valve lift mechanisms associated therewith. Therefore, the engine may be operated using only the first set of cylinder bores 26 during less than full power operation and the second set of cylinder bores 28 may be used during increased power demand conditions.

Figure 6:
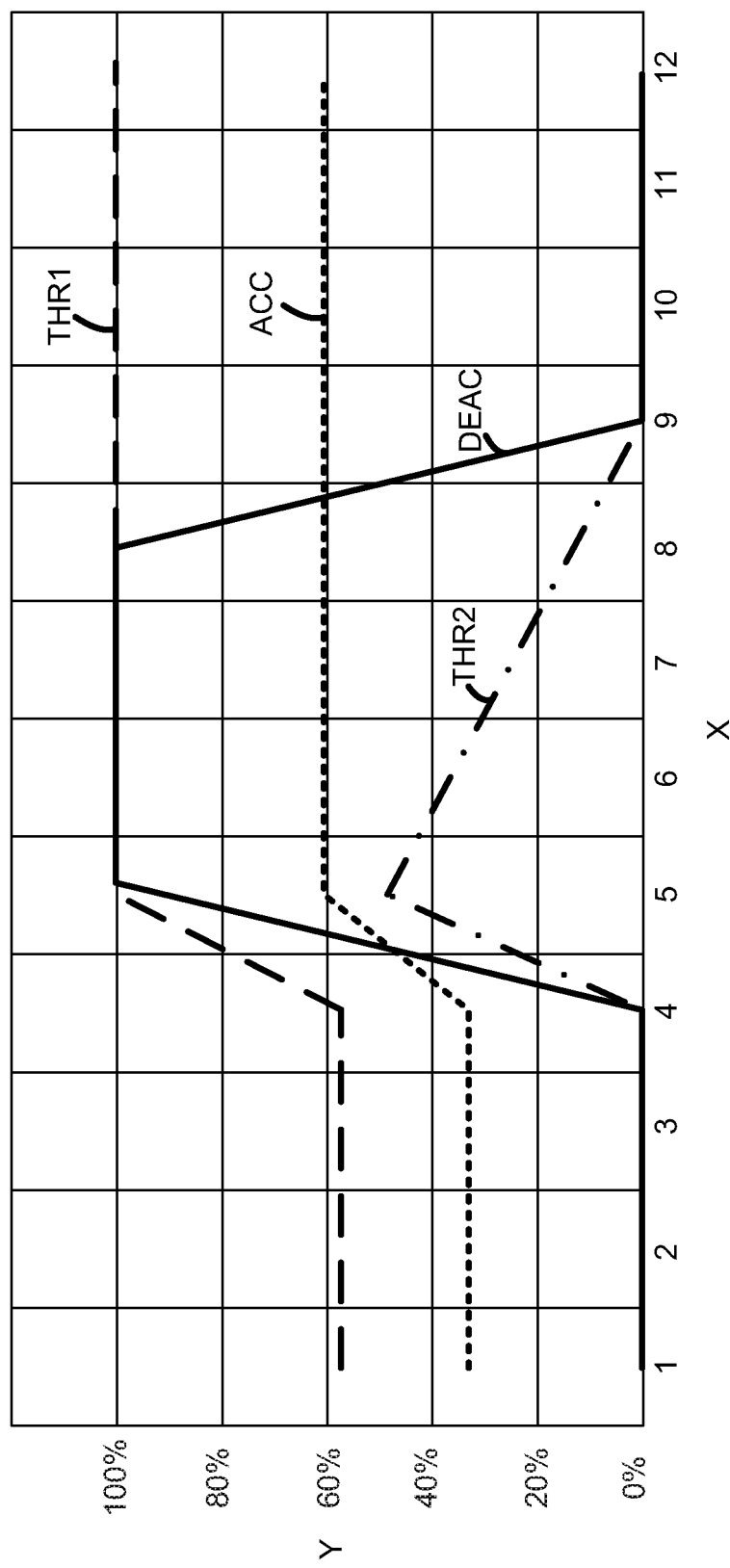
FIG. 6 is a graphical illustration of engine operation according to the present disclosure.

FIG. 6 graphically illustrates a non-limiting example of the general engine operation discussed above. In FIG. 6, the x-axis is time and the y-axis represents percentage. The time represented on the x-axis is simply for illustration and therefore is represented as steps 1-12 without a specific correlation to a magnitude of time. FIG. 6 illustrates four curves: percent actuation of accelerator pedal 222 (ACC), percent opening of the first throttle valve 206 (THR1), percent opening of the second throttle valve 208 (THR2) and on-off condition of the second set of cylinder bores 28 (DEAC). The on condition of the second set of cylinder bores 28 corresponds to the first mode of the second valve lift mechanism 48 and is represented as 100%. The off condition of the second set of cylinder bores 28 corresponds to the second mode of the second valve lift mechanisms 48 and is represented as 0%.

Operation may begin with the driver maintaining the accelerator pedal in an intermediate position (35% depression) during a first phase from steps 1-4. During the first phase, the first throttle valve 206 may be in a partially open position (58% open). The second set of cylinder bores 28 may be operated in the off condition (second valve lift mechanism 48 in the second mode) and, therefore, the second throttle valve 208 may be closed.

At step 4, the driver depresses the accelerator pedal to accelerate (60% depression). The second valve lift mechanism 48 is switched to the first mode (second set of cylinder bores 28 in the on condition) and the second throttle valve 208 is ramped partially open (20% open) from steps 4-5. The second throttle valve 208 is ramped open then ramped back to the closed position from steps 5-9. The second valve lift mechanism 48 is then switched back to the second mode (second set of cylinder bores 28 in the off condition) at step 9.

Activating the second set of cylinder bores 28 during steps 4-9 may supplement the power demanded by the driver during the acceleration condition until the first set of cylinder bores 26 can provide the requisite power output. The time from steps 4-9 may correspond to a power lag from the boost mechanism (e.g., turbo lag). The use of the second set of cylinder bores 28 during steps 4-9 may mitigate power disruption during increased power demand conditions, such as vehicle acceleration.

The second set of cylinder bores 28 may be maintained in the off condition and the second throttle valve 208 may be maintained in the closed position after the first set of cylinder bores 26 is able to provide the requisite power output (steps 9-12). The example shown in FIG. 6 illustrates a part-load condition. However, it is understood that the second set of cylinder bores 28 can also supplement engine power output during a full load condition.

What is claimed is:

1. An engine assembly comprising:
    a boost mechanism in communication with an air source;
    an engine structure defining a first cylinder bore, a second cylinder bore, a first intake port in communication with the boost mechanism and in communication with the first cylinder bore so as to only receive intake air from the boost mechanism during operation of the engine assembly, and a second intake port in communication with the air source and the second cylinder bore and wherein the second cylinder bore is isolated from the boost mechanism;
    a first intake valve located in the first intake port;
    a first valve lift mechanism engaged with the first intake valve;
    a second intake valve located in the second intake port; and
    a second valve lift mechanism engaged with the second intake valve and operable in first and second modes, the second intake valve being displaced to an open position by the second valve lift mechanism during the first mode and the second intake valve being maintained in a closed position by the second valve lift mechanism during the second mode.

2. The engine assembly of claim 1, further comprising a first intake manifold in communication with the first intake port and the air source via the boost mechanism and a second intake manifold in communication with the second intake port and the air source.

3. The engine assembly of claim 2, wherein the engine structure defines a first set of cylinder bores and a second set of cylinder bores disposed at an angle relative to the first set of cylinder bores, the first set of cylinder bores including the first cylinder bore and being in communication with the first intake manifold and the second set of cylinder bores including the second cylinder bore and being in communication with the second intake manifold.

4. The engine assembly of claim 3, wherein the first intake manifold is in communication with the boost mechanism and provides a compressed air flow to the first set of cylinder bores from the boost mechanism.

5. The engine assembly of claim 4, wherein the second intake manifold provides a naturally aspirated air flow to the second set of cylinder bores.

6. The engine assembly of claim 2, further comprising a first exhaust manifold in communication with the first cylinder bore and a second exhaust manifold in communication with the second cylinder bore.

7. The engine assembly of claim 6, wherein the boost mechanism includes a turbocharger in communication with the air source and the first exhaust manifold, the turbocharger driven by an exhaust gas exiting the first exhaust manifold and providing a compressed air flow to the first intake port, an exhaust gas exiting the second exhaust manifold being provided directly to a vehicle exhaust system.

8. The engine assembly of claim 1, wherein a first camshaft lobe is engaged with the first valve lift mechanism and a second camshaft lobe is engaged with the second valve lift mechanism, the second intake valve being displaced to the open position by a peak of the second camshaft lobe during the first mode and the second intake valve remaining in the closed position when the peak of the second camshaft lobe engages the second valve lift mechanism during the second mode.

9. The engine assembly of claim 1, further comprising an intake assembly including a first throttle valve and a second throttle valve, the first throttle valve being in communication with the first intake port and controlling an air flow into the first intake port and the second throttle valve being in communication with the second intake port and controlling an air flow into the second intake port.

10. The engine assembly of claim 1, wherein the engine structure defines a first set of cylinder bores including the first cylinder bore and a second set of cylinder bores including the second cylinder bore and disposed at an angle relative to the first set of cylinder bores, the first set of cylinder bores being in communication with the boost mechanism and the second set of cylinder bores being isolated from the boost mechanism.

11. A method comprising:
    providing a compressed intake air flow to a first intake manifold that is connected to a first set of cylinders via a plurality of first intake ports of an engine assembly so as to only receive compressed intake air during operation of the engine assembly;
    opening a plurality of first intake valves located in the plurality of first intake ports with a plurality of first valve lift mechanisms;
    providing a naturally aspirated intake air flow to a second intake manifold that is connected to a second set of cylinders via a plurality of second intake ports of the engine assembly, the second set of cylinders being isolated from the compressed intake air flow;

operating a plurality of second valve lift mechanisms in a first mode where the plurality of second valve lift mechanisms open a plurality of second intake valve located in the plurality of second intake ports; and operating the plurality of second valve lift mechanisms in a second mode where the plurality of second valve lift mechanisms maintain the plurality of second intake valves in a closed position during engine operation.

12. The method of claim 11, wherein the plurality of first intake valves are opened when the plurality of first valve lift mechanisms are engaged with a peak of a plurality of first camshaft lobes, operating the plurality of second valve lift mechanisms in the first mode includes opening the plurality of second intake valves when the plurality of second valve lift mechanisms are engaged with a peak of a plurality of second camshaft lobes and operating the plurality of second valve lift mechanisms in the second mode includes the plurality of second intake valves remaining in the closed position when the peak of the plurality of second camshaft lobes engage the plurality of second valve lift mechanisms.

13. The method of claim 12, wherein the plurality of second valve lift mechanisms are operated in the second mode while the plurality of first valve mechanisms are operated in a third mode where the plurality of first intake valves are opened when the plurality of first valve lift mechanisms are engaged with the peak of the plurality of first camshaft lobes.

14. The method of claim 11, further comprising operating the plurality of first valve lift mechanisms in a third mode where the plurality of first intake valves are opened with the plurality of first valve lift mechanisms while the plurality of second valve lift mechanisms operated in the first mode during a vehicle acceleration condition.

15. The method of claim 14, wherein the providing the compressed air flow includes driving a turbocharger with an exhaust gas flow from the engine assembly.

16. The method of claim 15, further comprising switching the plurality of second valve lift mechanisms from the first mode to the second mode after the turbocharger reaches a predetermined boost condition.

17. The method of claim 14, wherein the plurality of first valve lift mechanisms are operated in the third mode and the plurality of second valve lift mechanisms are operated in the first mode during start-up of the engine assembly.

18. The method of claim 14, further comprising operating the engine assembly during a first power demand condition where a first engine power output is demanded and operating the engine assembly during a second power demand condition where a second engine power output greater than the first engine power output is demanded, the plurality of first valve lift mechanisms being operated in the third mode during the first power demand condition and the second power demand condition and the plurality of second valve lift mechanisms being operated in the second mode during the first power demand condition.

19. The method of claim 18, wherein the plurality of second valve lift mechanisms are operated in the first mode during the second power demand condition.

20. The method of claim 19, wherein the plurality of second valve lift mechanism is operated in the first mode during a vehicle acceleration condition.

* * * * *